United States Patent [19]

Carpenter

[11] 4,218,175
[45] Aug. 19, 1980

[54] WIND TURBINE

[76] Inventor: Robert D. Carpenter, 16214 Pasada Dr., Whittier, Calif. 90603

[21] Appl. No.: 964,344

[22] Filed: Nov. 28, 1978

[51] Int. Cl.[2] .............................................. F03D 1/04
[52] U.S. Cl. ........................................ 415/2; 415/75; 416/176
[58] Field of Search ............................. 415/2–4, 415/72, 73, 75; 416/176, 177, 176 A

[56] References Cited

U.S. PATENT DOCUMENTS

| 31,121 | 1/1861 | Holmes | 415/2 |
|---|---|---|---|
| 231,253 | 8/1880 | Austin | 415/129 |
| 833,184 | 10/1906 | Terzian | 415/2 |
| 981,077 | 1/1911 | Feldner | 415/2 |
| 1,002,833 | 9/1911 | Giddings | 415/2 A |
| 1,186,289 | 6/1916 | Dalen | 415/2 |
| 1,361,696 | 12/1920 | Domenico | 415/177 |
| 1,514,293 | 11/1924 | Lawaczeck | 415/72 X |
| 1,816,971 | 8/1931 | Hoff et al. | 415/75 |
| 2,195,902 | 4/1940 | Pezzillo | 415/72 |
| 3,198,423 | 8/1965 | Clute | 415/72 X |
| 3,209,156 | 9/1965 | Struble | 290/54 |
| 3,339,078 | 8/1967 | Crompton | 415/2 X |
| 4,021,135 | 5/1977 | Pedersen | 415/2 |
| 4,075,500 | 2/1978 | Oman et al. | 415/147 X |
| 4,079,264 | 3/1978 | Cohen | 415/2 A X |
| 4,086,498 | 4/1978 | Szoeke | 415/2 X |
| 4,087,196 | 5/1978 | Kronmiller | 415/2 A |
| 4,132,499 | 1/1979 | Igra | 415/DIG. 1 X |
| 4,143,992 | 3/1979 | Crook | 415/2 A |

FOREIGN PATENT DOCUMENTS

| 76475 | 12/1948 | Czechoslovakia | 415/75 |
|---|---|---|---|
| 33383 | 6/1924 | Denmark | 415/2 A |
| 801772 | 8/1936 | France | 415/73 |
| 827487 | 4/1938 | France | 416/176 A |
| 1011132 | 6/1952 | France | 415/2 A |
| 1031023 | 6/1953 | France | 415/4 |
| 162999 | 5/1921 | United Kingdom | 415/121 A |

Primary Examiner—Everette A. Powell, Jr.
Attorney, Agent, or Firm—Stuart W. Knight

[57] ABSTRACT

A wind turbine is provided consisting of a cone or the frustum of a cone, on which are mounted in a more or less helical fashion, a plurality of blades having a varying pitch angle. The blades are arranged in a manner to utilize the initial force of the wind and to continue to utilize the diminishing force of the wind after it passes over the leading end of the vanes.

Provided also is a shroud which enhances the wind velocity and provides a suitable diffuser augmenter to dissipate the spent wind force.

3 Claims, 3 Drawing Figures

WIND TURBINE

BACKGROUND OF THE INVENTION

Many successful forms of wind driven machines have been used throughout the history of man. In recent times, there has been a need to improve the efficiency of these machines, and much work has been done on ever larger and more efficient propeller designs, each utilizing the basic concept of wind as a plane passing over the blades.

The basis of the present invention is that wind can be considered as a mass, which although subject to change in form, velocity and volume, will nevertheless continue to exert a force after passing over the initial surface of a turbine blade. It can therefore, be seen that a turbine blade which allows for the decreasing efficiency of the wind mass, can utilize this secondary force to enhance the efficiency of the initial wind contact. This is accomplished in the present invention by mounting the turbine blades on a cone or the frustum of a cone in a more or less helical manner and in such a way as to allow the variations of the wind mass to pass over the turbine blades at a varying angular contact made possible by the changing helical angle of the blade. The value of this design is particularly apparent in slower moving wind.

DETAILED DESCRIPTION OF THE INVENTION

Figure 3:
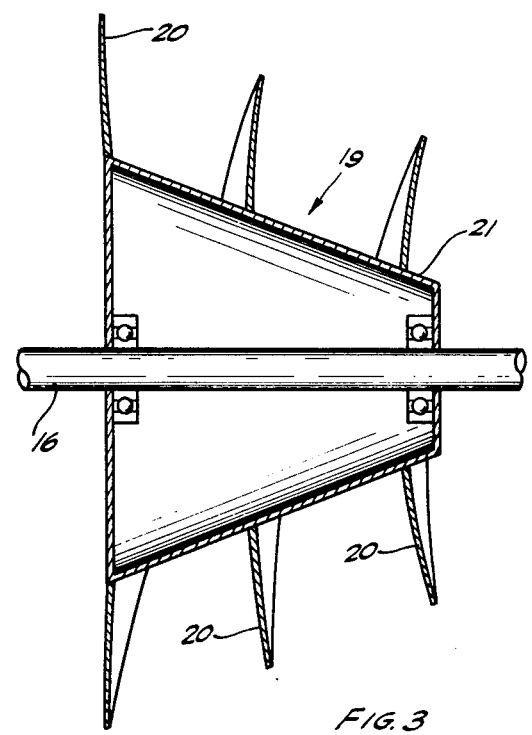
FIG. 3 is an enlarged cross section of the wind turbine taken in the axis of plane 2 in FIG. 2 and rotated to the horizontal.

The wind turbine 19 consists of a cone 12 and the frustum of a cone 21, and a plurality of more or less helical vanes 20 which can originate at a point near the small diameter of the frustum (or at any point of the smaller diameters of a fully rotating cone or a frustum), and winds through an increasing angle relative to the center line of the frustum terminating near the large diameter. The conical surface may be solid as shown or may be skeletal and providing a framework for the helical vanes. The helical vanes could be mounted on or in these or other known means. As shown in FIG. 3, the leading surface of the vane 20 will vary in form depending on the size of the wind turbine and on the anticipated velocity of the wind. The wind turbine 19 is axially mounted on a suitable shaft 16 which is connected to a suitable base by known means. As the moving wind engages the vane 20 it forces the rotation of the frustum 21, but as the wind tries to escape and spin off, it contacts the remaining area of the expanding helical vane and continues to exert a rotational force on the frustum, thus multiplying the effective force of the initial wind contact. Further augmentation of the force is realized as the velocity of the wind is enhanced due to the inclined surface of the frustum.

Figure 1:
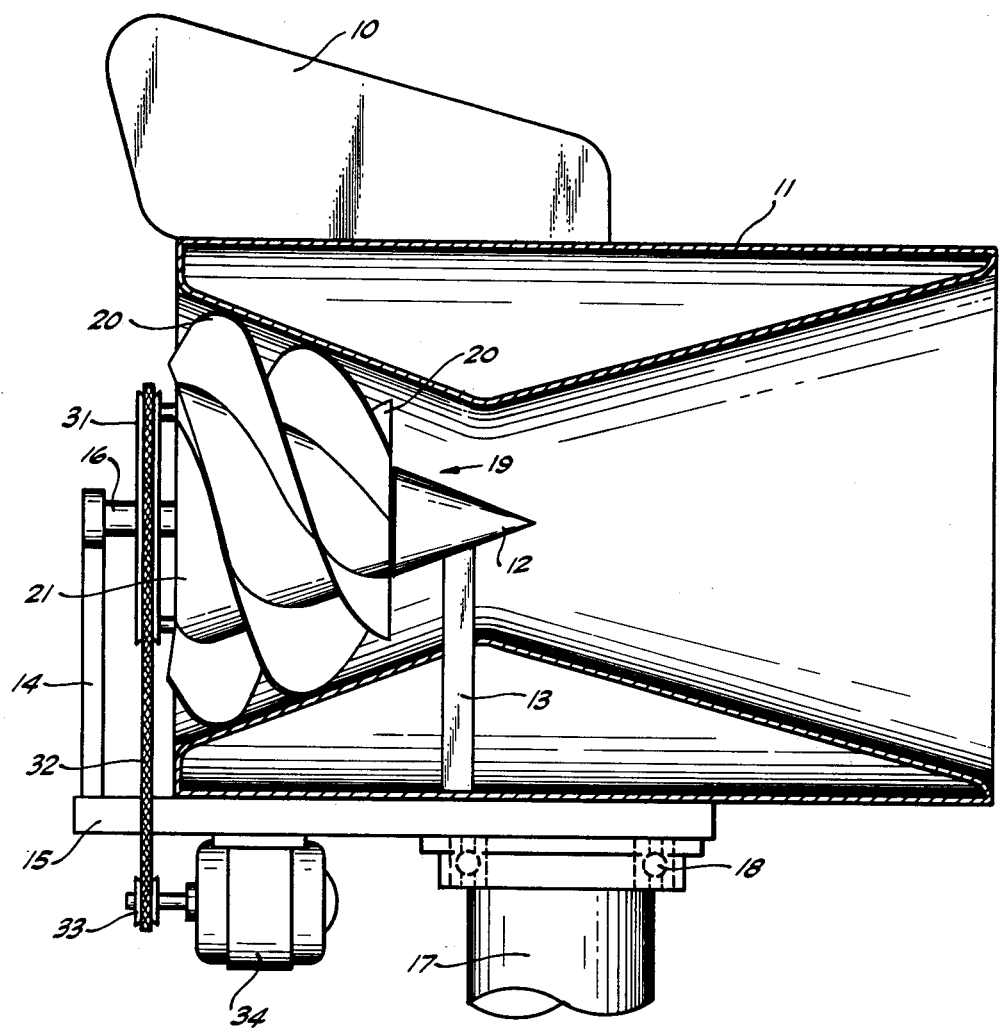
FIG. 1 is a side view of the wind turbine embodied in a shroud which incorporates an air scoop and a diffuser augmenter mounted on a rotating base with a power take off to an electrical generator.
Figure 2:
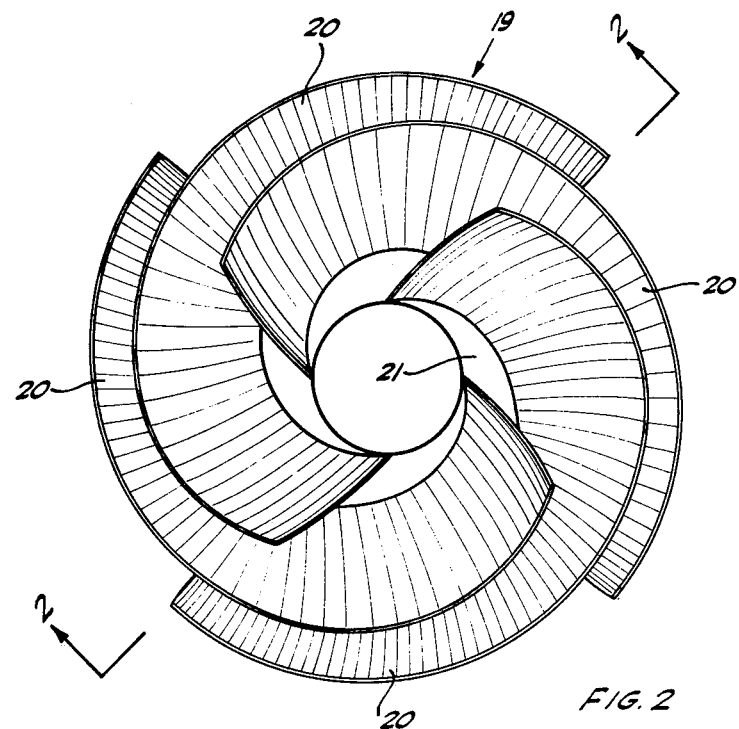
FIG. 2 is an enlarged front view of the wind turbine only.

The embodiment of the wind turbine as shown in FIG. 1 includes a shroud 11 which incorporates an air scoop with a diffuser augmenter, utilizing the well known venturi principle to increase the speed of the wind flow and while the shroud is not required for efficient operation of the wind turbine, it has been shown to enhance the performance. The shape of the shroud's inlet, outlet with its inner and outer surfaces, may be curved, such as circular or flat, such as square or rectangular.

It may be noted that the vanes may be of a continual element for the full length of the vane or may consist of separate sections allowing a feathering by mechanically varying the pitch angle in the small segments. Other means of controlling speed would include fenestrating the vanes and providing, by known means, a method of mechanically covering and uncovering the holes.

In addition, a cone 12 is shown, which may be an integral part of the frustum or detached and which also improves performances by increasing the velocity of the wind due to its inclined surface, and by minimizing turbulence. It also provides a suitable location for the mounting strut 13, which together with the rear strut 14 and the base 15 provide a suitable bracket to mount on column 17 and utilizing rollers or bearings 18 to orient the turbine into the wind with one or a plurality of vanes 10 suitably sized.

Illustrated in this embodiment is a pulley 31 mounted to the wind turbine and by means of a belt or chain 32 driving a pulley 33 and a generator 34 or other power take off system of known means such as an air compressor or direct mechanical drive.

What is claimed is:

1. A wind turbine consisting of a cone with a plurality of vanes extending outwardly more or less perpendicular to the surface of the cone and winding more or less in a helical fashion from a smaller diameter of the cone, but with a changing pitch angle and terminating or or near the large diameter of the cone; a shaft communicating with said cone at the center line of said cone; a wind tunnel surrounding said cone, comprising a converging inlet; a diverging outlet and a throat area; the tip of said cone being located at approximately said throat area and the larger diameter of said cone located at or near the outlet of said tunnel.

2. The wind turbine described in claim 1 suitably mounted on a shaft and including a pulley or other known means for the power take off.

3. The device of claim 1 wherein said vanes extend from said cone to the inner surface of said wind tunnel.

* * * * *